United States Patent
Wu et al.

(10) Patent No.: US 11,556,837 B2
(45) Date of Patent: Jan. 17, 2023

(54) CROSS-DOMAIN FEATURING ENGINEERING

(71) Applicant: General Electric Company, Schenectady, NY (US)

(72) Inventors: Siyu Wu, San Ramon, CA (US); Alexander Graf, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1038 days.

(21) Appl. No.: 16/233,499

(22) Filed: Dec. 27, 2018

(65) Prior Publication Data
US 2020/0210881 A1    Jul. 2, 2020

(51) Int. Cl.
G06N 20/00    (2019.01)
G06F 9/448    (2018.01)

(52) U.S. Cl.
CPC ............. G06N 20/00 (2019.01); G06F 9/448 (2018.02)

(58) Field of Classification Search
None
See application file for complete search history.

(56) References Cited

U.S. PATENT DOCUMENTS

2017/0316050 A1* 11/2017 Hill .................... G06F 16/2428

OTHER PUBLICATIONS

Pan SJ, Yang Q. A survey on transfer learning. IEEE Transactions on knowledge and data engineering. Oct. 16, 2009;22(10):1345-59. (Year: 2009).*
Wang K, Wu B. Power equipment fault diagnosis model based on deep transfer learning with balanced distribution adaptation. In International Conference on Advanced Data Mining and Applications Nov. 16, 2018 (pp. 178-188). Springer, Cham. (Year: 2018).*
Chen Z, Wang S, Shen Z, Chen Y, Zhao Z. Online sequential ELM based transfer learning for transportation mode recognition. In2013 IEEE Conference on Cybernetics and Intelligent Systems (CIS) Nov. 12, 2013 (pp. 78-83). IEEE. (Year: 2013).*
Sun X, Gui G, Li Y, Liu RP, An Y. ResInNet: A novel deep neural network with feature reuse for Internet of Things. IEEE Internet of Things Journal. Jul. 6, 2018;6(1):679-91. (Year: 2018).*
Li L, Liang J, Weng M, Zhu H. A multiple-feature reuse network to extract buildings from remote sensing imagery. Remote Sensing. Sep. 2018;10(9):1350. (Year: 2018).*

(Continued)

*Primary Examiner* — Vincent Gonzales
(74) *Attorney, Agent, or Firm* — Buckley, Maschoff & Talwalkar LLC (57) ABSTRACT

The example embodiments are directed to a continuously expanding cross-domain featuring engineering system. In one example, a method may include one or more of storing predictive features in a cross-domain data store, the predictive features previously used in machine learning modeling in a plurality of different domains, receiving data of an asset included in a target domain and information about an evaluation attribute associated with the asset in the target domain, determining a predictive feature in the received data based on a previously used predictive feature stored in the cross-domain data store which is associated with a machine learning model in a different domain and the evaluation attribute, and outputting the determined predictive feature for display via a user interface.

18 Claims, 6 Drawing Sheets

(56) References Cited

OTHER PUBLICATIONS

Long M, Wang J, Cao Y, Sun J, Philip SY. Deep learning of transferable representation for scalable domain adaptation. IEEE Transactions on Knowledge and Data Engineering. Apr. 14, 2016;28(8):2027-40. (Year: 2016).*

Zhang QS, Zhu SC. Visual interpretability for deep learning: a survey. Frontiers of Information Technology & Electronic Engineering. Jan. 2018;19(1):27-39. (Year: 2018).*

* cited by examiner

(Aviation Domain)

331 — *Feature A, Domain B*: Check engine speed when engine output temperature is above 200 degrees ↓ *Decompose*

332 — *Agnostic Feature*: Check Variable A when Variable B is above Threshold X

(Wind Turbine Domain)

334 — *Feature A, Domain A*: Check bend angle in rotor blade when noise is above 95 decibels ↑ *Expand*

333 — *Agnostic Feature*: Check Variable A when Variable B is above Threshold X Host Platform 330

FIG. 5

CROSS-DOMAIN FEATURING ENGINEERING

BACKGROUND

Machine and equipment assets are engineered to perform particular tasks as part of a process. For example, assets can include, among other things, industrial manufacturing equipment on a production line, drilling equipment for use in mining operations, wind turbines that generate electricity on a wind farm, transportation vehicles (trains, subways, airplanes, etc.), gas and oil refining equipment, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the overwhelming adoption of cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

Machine learning is a method of data analysis that automates analytical model building for use with operation, maintenance, control, etc. of assets in an industrial environment. Machine learning is a branch of artificial intelligence based on the idea that a system can learn from data, identify patterns, and make decisions, with minimal human intervention. Machine learning is the process of generalizing from a set of training data to predict or infer an output. Machine learning algorithms normally take in a collection of numeric examples as input. This process, known as "fitting" or "training," is completed to build a model that the algorithms can use to predict output in the future. To create a model, feature engineering is necessary to convert data into a machine learning-ready format. The choice of features is crucial for both interpretability and performance.

Feature engineering is an essential part of building any intelligent system. Typically, a problem (or issue to be analyzed) is domain specific and better features (suited to the problem) are the deciding factor of the performance of a machine learning model. Feature engineering is an art as well as a science which is the reason data scientists often spend most of their time in the data preparation phase before modeling. One of the difficulties in feature engineering is identifying features from a limited feature space of domain-specific features which fit a current problem/solution. However, these limited feature spaces are not sufficient for developing machine learning models which meet strict, specific, and sometimes unconventional performance requirements, especially in mission critical industrial domains such as aviation, utilities, healthcare, etc. Accordingly, what is needed is a mechanism which improves how features are generated to acquire, if possible, sufficient predictive power for a particular industrial application.

SUMMARY

The embodiments herein improve upon the prior art by providing a system that performs cross-domain feature engineering. Traditional feature engineering is limited to a single domain. For example, in the aviation domain, a user may search and derive features from flight data which are specific to aviation such as flight speed, altitude, takeoff city, destination city, cabin pressure, and the like. The result is a small subset of specific features directed at solving a particular task. However, these domain-specific features are not always adequate for generating machine learning models that meet strict performance requirements. The example embodiments increase the feature space used for feature engineering by deriving features from a candidate pool of features from across a plurality of domains. As an example, features from healthcare may be used to solve a problem in aviation. Furthermore, the system herein can automatically recommend features from different domains for use in building machine learning models in a target domain. Accordingly, the example embodiments greatly expand the amount of features available to users (e.g., data scientists, machine learning engineers, etc.) thereby enabling the creation of potentially more accurate, efficient, and robust machine learning models.

In an aspect of another example embodiment, a method may include one or more of storing predictive features in a cross-domain data store, the predictive features previously used in machine learning modeling in a plurality of different domains, receiving data of an asset included in a target domain and information about an evaluation attribute associated with the asset in the target domain, determining a predictive feature in the received data based on a previously used predictive feature stored in the cross-domain data store which is associated with a machine learning model in a different domain and the evaluation attribute, and outputting the determined predictive feature for display via a user interface.

In an aspect of an example embodiment, a method may include one or more of a cross-domain storage configured to store predictive features, the predictive features previously used in machine learning modeling in a plurality of different domains, and a processor configured to receive data of an asset included in a target domain and information about an evaluation attribute associated with the asset in the target domain, determine a predictive feature in the received data based on a previously used predictive feature stored in the cross-domain data store which is associated with a machine learning model in a different domain and the evaluation attribute, and output the determined predictive feature for display via a user interface.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a cross-domain featuring engineering system that can generate and recommend optimal features for building machine learning models in a first domain (or vertical) based on features previously used for building machine learning models in a second domain. Machine learning typically includes steps such as gathering data, cleaning data, featuring engineering, defining model type(s), training and testing model(s) that provides a predictive output. In some cases, an ensemble model may be used which is a combination of multiple models of various types to generate a final prediction. For this reason, multiple machine learning models are often involved in a particular application. Feature engineering in machine learning can create a significant difference between a good model and a bad model. In fact, good features can be more important than a type of predictive algorithm used in the model.

Ingesting raw data and building models on top of the raw data often does not provide desired results or performance because predictive algorithms, without any guidance from the physical world, are not intelligent enough to automatically extract sufficient meaningful features from raw data. Feature engineering is a process of transforming raw data into features that better represent the underlying system dynamics of the application the predictive models try to handle, resulting in improved model accuracy on unseen data. When performing a feature engineering process, model developers typically rely on domain knowledge to extract new variables from raw data that make machine learning algorithms work. For any given dataset, an infinite number of possible features can be chosen. A crucial point to consider is how to generate those feature in a systematic and automatic fashion and which features are optimal to use.

A feature is typically a specific representation on top of raw data, which is an individual, measurable attribute, typically depicted by one or multiple columns in a dataset. In this example, multiple means that features are generated by observing interactions among multiple attributes. As a very simple example, a feature such as amount of time since purchase could be derived from a dataset of automobile information which includes a date of purchase by a developer considering a difference between a current date and the date of purchase. Considering a generic two-dimensional dataset, each observation is depicted by a row and each feature by a column, which will have a specific value for an observation. Better features give a developer a flexibility, provide for simpler models, and provide for more accurate and robust models. For example, a developer can choose a less complex model and still get good results when they have chosen good features. Most models can pick up on relationship between model inputs and outputs. The flexibility of good features allow less complex models to run, are easier to understand, and easier to train/maintain.

Engineers and other data scientists are usually domain experts that rely on their knowledge in a particular domain (e.g., healthcare, aviation, locomotive, energy, manufacturing, etc.) to create a domain-specific set of features. However, a quantitative function of a feature in one domain may be helpful as an underlying mathematical element for generating new features in a different domain. For example, for a jet engine, a feature such as Rainflow can be useful to check the occurrences of an engine speed shift across given speed bands. This same feature, when applied to body movement of an NBA player, can also be used to improve prediction performance of an algorithm that predicts if the same player is susceptible to a leg injury.

The example embodiments provide an automatic platform that curates a cross-industry, continuously expanding, both data and domain driven feature space. This enlarged feature space (1) centralizes all known features from across different domains, (2) automates feature generation, and (3) can be readily used as a comprehensive and extensive feature candidate pool to create ML models across all industries. In some embodiments, the cross-domain feature engineering system and data pool can be incorporated into a software module, library, program, etc. and incorporated within existing and/or new software. When new predictive features are determined for an asset, the newly determined features may be propagated or otherwise fed to pre-existing modules for continuously increasing the cross-domain feature store implemented therein with the new features. In this way, the cross-domain feature pool is a continuously growing list of features from across a plurality of domains that continues to learn and store new features over time. The growing list of features can be used for machine learning model development.

For example, the system described herein may be implemented via a module or other software that may be used in conjunction with applications for managing machine and equipment assets hosted within an industrial internet of things (IIoT). An IIoT may connect assets, such as turbines, jet engines, locomotives, elevators, healthcare devices, mining equipment, oil and gas refineries, and the like, to the Internet or cloud, or to each other in some meaningful way such as through one or more networks. The cloud can be used to receive, relay, transmit, store, analyze, or otherwise process information for or about assets and manufacturing sites. In an example, a cloud computing system includes at least one processor circuit, at least one database, and a plurality of users and/or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Assets may be outfitted with one or more sensors (e.g., physical sensors, virtual sensors, etc.) configured to monitor respective operations or conditions of the asset and the environment in which the asset operates. Data from the sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like.

While progress with industrial and machine automation has been made over the last several decades, and assets have become 'smarter,' the intelligence of any individual asset pales in comparison to intelligence that can be gained when multiple smart devices are connected together, for example, in the cloud. Aggregating data collected from or about multiple assets can enable users to improve business processes, for example by improving effectiveness of asset maintenance or improving operational performance if appropriate industrial-specific data collection and modeling technology is developed and applied.

The integration of machine and equipment assets with the remote computing resources to enable the IIoT often presents technical challenges separate and distinct from the specific industry and from computer networks, generally. To address these problems and other problems resulting from the intersection of certain industrial fields and the IIoT, the example embodiments provide a mechanism for cross-pollination of features across different industrial domains.

Asset management technology enabled by state of the art cutting edge tools and cloud computing techniques enables incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial or healthcare based assets can be uniquely situated to leverage its understanding of assets themselves, models of such assets, and industrial operations or applications of such assets, to create new value for industrial customers through asset insights.

As described in various examples herein, data may include a raw collection of related values of an asset or a process/operation including the asset, for example, in the form of a stream (in motion) or in a data storage system (at rest). Individual data values may include descriptive metadata as to a source of the data and an order in which the data was received, but may not be explicitly correlated. Information may refer to a related collection of data which is imputed to represent meaningful facts about an identified subject. As a non-limiting example, information may be a dataset such as a dataset which has been determined to represent temperature fluctuations of a machine part over time.

Figure 1:
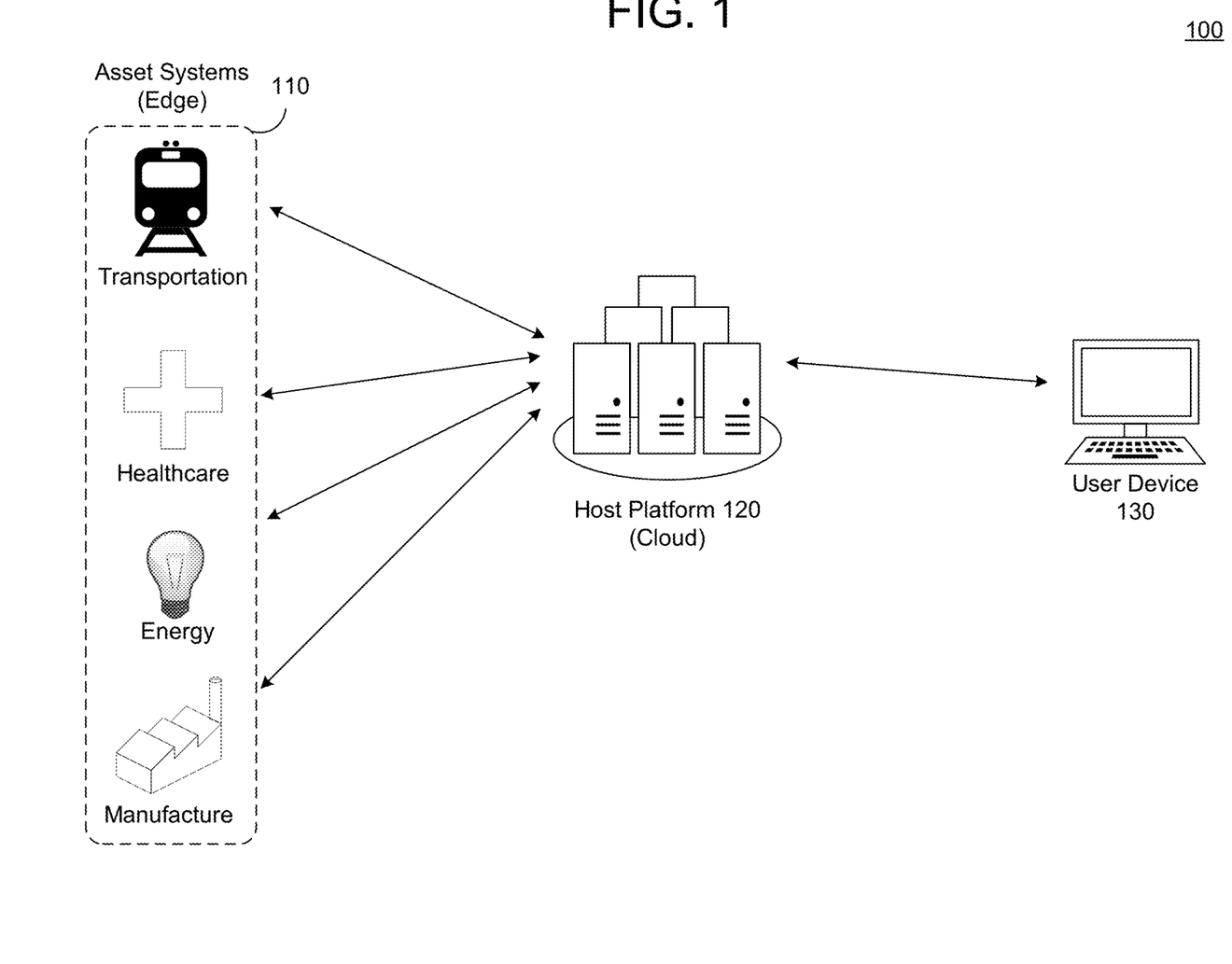
FIG. 1 is a diagram illustrating an industrial cloud computing environment for machine learning in accordance with an example embodiment.

FIG. 1 illustrates a cloud computing system 100 for industrial software and hardware in accordance with an example embodiment. Referring to FIG. 1, the system 100 includes a plurality of assets 110 which may be included within an edge of an IIoT and which may transmit raw data to a source such as cloud computing platform 120 where it may be stored and processed. It should also be appreciated that the cloud platform 120 in FIG. 1 may be replaced with or supplemented by a non-cloud based platform such as a server, an on-premises computing system, and the like. Assets 110 may include hardware/structural assets such as machine and equipment used in industry, healthcare, manufacturing, energy, transportation, and that like. It should also be appreciated that assets 110 may include software, processes, actors, resources, and the like. A digital replica (i.e., a digital twin) of an asset 110 may be generated and stored on the cloud platform 120. The digital twin may be used to virtually represent an operating characteristic of the asset 110.

The data transmitted by the assets 110 and received by the cloud platform 120 may include raw time-series data output as a result of the operation of the assets 110, and the like. Data that is stored and processed by the cloud platform 120 may be output in some meaningful way to user devices 130. In the example of FIG. 1, the assets 110, cloud platform 120, and user devices 130 may be connected to each other via a network such as the Internet, a private network, a wired network, a wireless network, etc. Also, the user devices 130 may interact with software hosted by and deployed on the cloud platform 120 in order to receive data from and control operation of the assets 110.

Software and hardware systems can be used to enhance or otherwise used in conjunction with the operation of an asset and a digital twin of the asset (and/or other assets), may be hosted by the cloud platform 120, and may interact with the assets 110. For example, ML models (or AI models) may be used to optimize a performance of an asset or data coming in from the asset. As another example, the ML models may be used to predict, analyze, control, manage, or otherwise interact with the asset and components (software and hardware) thereof. The ML models may also be stored in the cloud platform 120 and/or at the edge (e.g. asset computing systems, edge PC's, asset controllers, etc.) To build these models, the example embodiments provide a cross-domain feature engineering module that can generate and suggest features for use in building machine learning models. Here, the machine learning models may be designed for a target domain and the features may be derived from other different domains. The module may be incorporated within the cloud platform 120, a user device 130, or the like. As another example, the module may be incorporated within a software application via a library, plug-in, etc.

The user device 130 may receive views of data or other information about the asset as the data is processed via one or more applications hosted by the cloud platform 120. For example, the user device 130 may receive graph-based results, diagrams, charts, warnings, measurements, power levels, and the like. As another example, the user device 130 may display a graphical user interface that allows a user thereof to input commands to an asset via one or more applications hosted by the cloud platform 120.

In some embodiments, an asset management platform (AMP) can reside within or be connected to the cloud platform 120, in a local or sandboxed environment, or can be distributed across multiple locations or devices and can be used to interact with the assets 110. The AMP can be configured to perform functions such as data acquisition, data analysis, data exchange, and the like, with local or remote assets, or with other task-specific processing devices. For example, the assets 110 may be an asset community (e.g., turbines, healthcare, power, industrial, manufacturing, mining, oil and gas, elevator, etc.) which may be communicatively coupled to the cloud platform 120 via one or more intermediate devices such as a stream data transfer platform, database, or the like.

Information from the assets 110 may be communicated to the cloud platform 120. For example, external sensors can be used to sense information about a function, process, operation, etc., of an asset, or to sense information about an environment condition at or around an asset, a worker, a downtime, a machine or equipment maintenance, and the like. The external sensor can be configured for data communication with the cloud platform 120 which can be configured to store the raw sensor information and transfer the raw sensor information to the user devices 130 where it can be accessed by users, applications, systems, and the like, for further processing. Furthermore, an operation of the assets 110 may be enhanced or otherwise controlled by a user inputting commands though an application hosted by the cloud platform 120 or other remote host platform such as a web server. The data provided from the assets 110 may include time-series data or other types of data associated with the operations being performed by the assets 110

In some embodiments, the cloud platform 120 may include a local, system, enterprise, or global computing infrastructure that can be optimized for industrial data workloads, secure data communication, and compliance with regulatory requirements. The cloud platform 120 may include a database management system (DBMS) for creating, monitoring, and controlling access to data in a database coupled to or included within the cloud platform 120. The cloud platform 120 can also include services that developers can use to build or test industrial or manufacturing-based applications and services to implement IIoT applications that interact with assets 110.

For example, the cloud platform 120 may host an industrial application marketplace where developers can publish their distinctly developed applications and/or retrieve applications from third parties. In addition, the cloud platform 120 can host a development framework for communicating with various available services or modules. The development framework can offer developers a consistent contextual user experience in web or mobile applications. Developers can add and make accessible their applications (services, data, analytics, etc.) via the cloud platform 120. Also, analytic software may analyze data from or about a manufacturing process and provide insight, predictions, and early warning fault detection.

The example embodiments provide a continuously growing selection of data-driven features and domain-driven features over time and experiences. As described herein, knowledge from multiple verticals (domains) such as aviation, healthcare, automobiles, etc. can be combined to create a fuller and more comprehensive set of features for purposes of featuring engineering for machine learning models. For each domain, the system herein may identify certain features (predictors) that help learn information about an asset (machine, equipment, human, software, etc.) for a particular task (when components may fail, when a power outage may occur, possibility of a cancer, etc.). The features or predictors can be put into machine learning models and help predict future information. These features are quantitative and mathematical based. By incorporating features across multiple domains, the system can significantly reduce the amount of time engineers spending building models from raw data to ML product, and greatly shorten the feature engineering process.

These features are quantitative and therefore have a mathematical format that involves both a single attribute and interactions among multiple attributes, for example, plus-minus, above a certain range, below a certain range, maximal, and minimal of attribute A, maximal of attribute A while attribute B is within a certain range, and the like. These quantitative attributes can be used to decompose domain-specific features into domain-agnostic quantitative attributes. For example, the system may decompose the features into basic mathematical elements and then have a pool of decomposed features which can be re-combined and used across different domains. Furthermore, the system herein may use machine learning to assess which newly created features are contributing positively, and which features form the optimal set for a particular problem in a particular domain. Such optimal features may be derived from different domains. This prediction can be based on the input raw data from the target domain as well as business metrics which are to be used to evaluate the model.

The system described herein may be a computer program, module, etc., which can be executing on a hardware device or implemented within a software component. The system may accumulate features across different domains, decompose the features to their basic mathematical attributes, and aggregate them together in various combinations and multiple dimensions to create a pool of features through the kitchen sink approach. This provides a pool of candidate features learned from knowledge acquired across many domains. The features in the pool may be considered domain-agnostic. Furthermore, machine learning may identify, out of that pool, what are the optimal features for a particular problem in a particular domain. Domain A could have features that are useful in Domain B. The system may auto-recommend features or a feature set based on input data received from the user and business metrics, or the like. The system herein can be used to streamline the process from raw data to predictive model. The automation is performed based on mathematical and/or business metrics in a particular problem. Furthermore, the system can continue to monitor performance of a model over time to thereby ensure that most optimal features are still relevant or to suggest new features that may be more relevant.

The system may be implemented via a module which may be distributed to programmers and developers. The module gives the developers the ability to use the modules during machine learning application development. In some cases, a user may be given the ability to narrow down possible features into subcategories. The user here is the machine learning related personnel. $H_2O$.ai they do the same automated model generation and they do feature engineering mostly based on mathematical/statistical. Our product can be incorporated by choice of the user based on consideration from the physical world.

Figure 2:
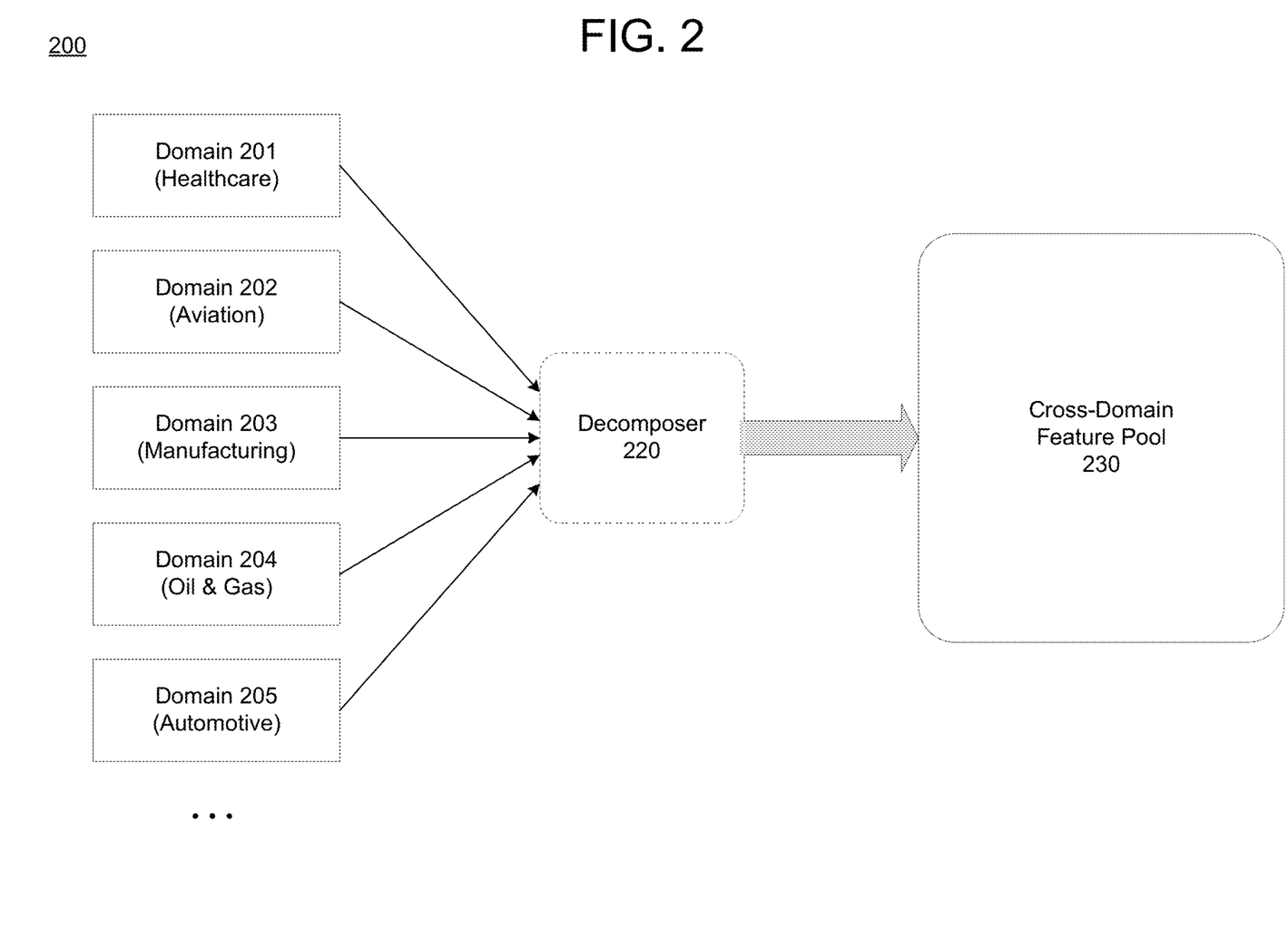
FIG. 2 is a diagram illustrating features from across a plurality of domains being stored in a common storage in accordance with an example embodiment.

FIG. 2 illustrates a cross-domain feature pool 230 which includes features which have been collected from a plurality of different domains 201-205. In this example, the domains include industrial-based domains such as healthcare machines, aviation, manufacturing, oil and gas, automotive, locomotive, elevator, drilling equipment, and the like. As another example, the domains may include non-industrial domains such as finance, sports, or the like. In some cases, the domains may include both industrial domains and non-industrial domains from which features are collected and pooled together in a cross-domain feature pool 230.

It is well known within the ML community that using good features, i.e., predictors used as inputs of machine learning models, are the dominant drivers that lead to high machine learning model performance. In current industrial machine learning practice, features are typically generated based on physical knowledge or data-driven methods within a particular domain. This practice leads to multiple independent, small, and domain-specific feature spaces with minimal interactions or cross-pollination. Sometimes, these limited feature spaces are not sufficient for developing ML models that meet strict performance requirements.

However, some features identified in one domain can be used to improve model performance in another domain significantly. For example, for jet engine, one feature (Rainflow) checks the occurrences when engine speed shifts across given speed bands. The same feature, when applied to body movement of an NBA player, improves leg injury prediction accuracy significantly. The example embodiments provide an automatic platform that curates a cross-industry, continuously expanding, both data and domain driven feature space which may be stored in the cross-domain feature pool 230. This enlarged feature space (1) centralizes all known features, (2) automates feature generation, and (3) can be readily used as a comprehensive and extensive feature candidate pool to create ML models across all industries.

In the example of FIG. 2, a decomposer 220 may decompose features from their domain-specific functionality into a more basic functionality that is domain-agnostic. For example, a feature such as "when the speed of the locomotive exceeds 75 mph, check the maximum engine temperature," may be decomposed into "when variable A exceeds level Y, check the maximum of variable B." By decomposing features into a quantitative representation, the features become transferrable from one domain to the next. Furthermore, when used in a different domain, the feature may be expanded based on the particular variables in the next (different) domain.

According to various aspects, the example embodiments creates a feature space that includes all known features across different industries. Original features may be decomposed into basic mathematical elements, which can be re-mixed with elements from other features in a new/different domain to generate new features. The system herein may further apply data-driven methods (such as autoencoder) on domain-specific or other manually created features to create new, higher dimensional features. As a result, new effective features from a first domain can be added to an existing feature space of a second domain. When predicting new features based on decomposed mathematical elements, the more attributes that the software interacts with, the more potential new features can be generated. This maximizes the full cross-pollination potential of leveraging all learnt features so far. The features stored in the feature space data store may be continuously growing as well as new features are identified they may be added to the storage and used in the cross-domain feature engineering process.

Figure 3A:
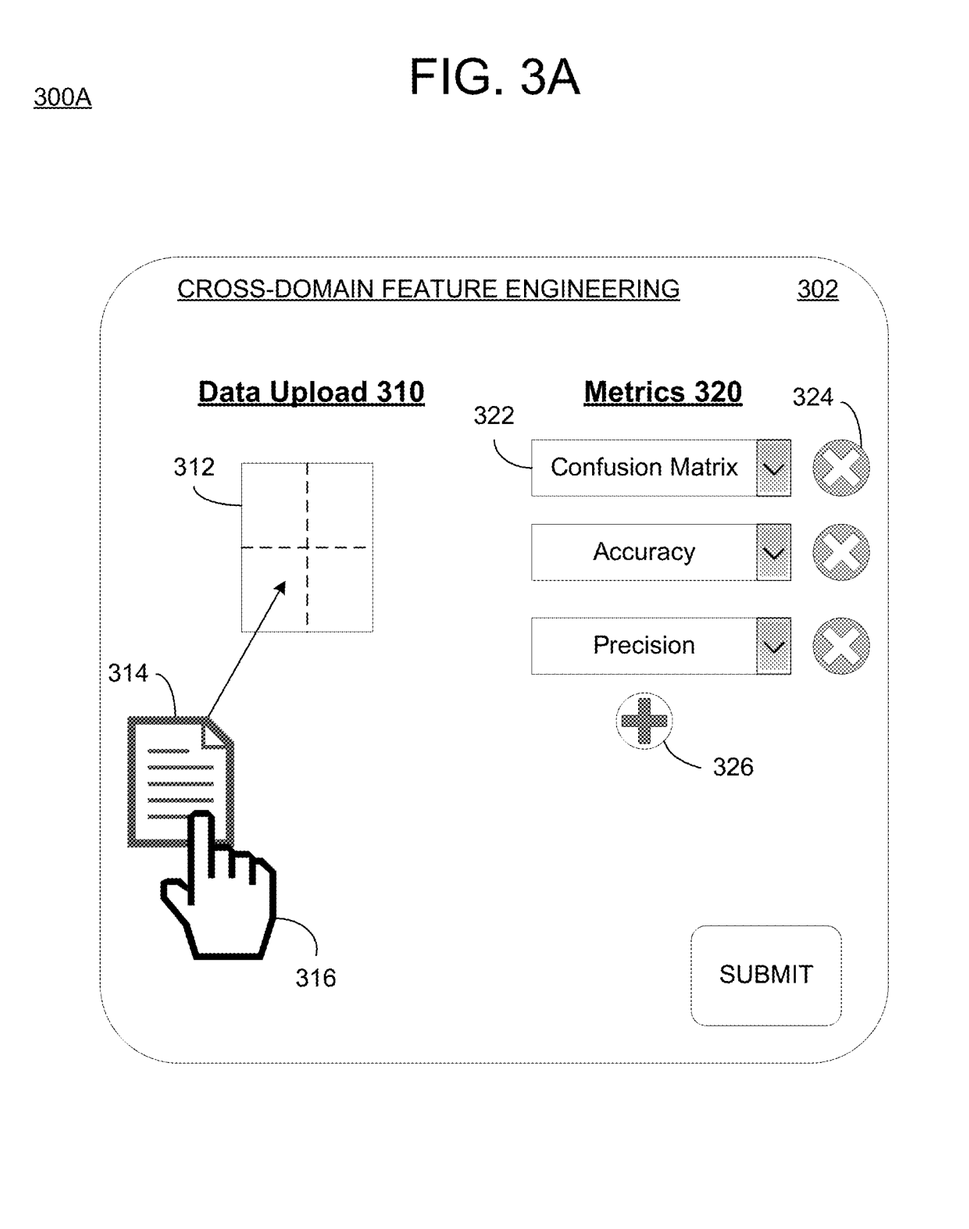
FIGS. 3A-3B are diagrams illustrating a process of cross-domain feature engineering in accordance with an example embodiment.

FIG. 3A illustrates a process 300A of uploading data to the cross-domain feature engineering system via a user interface 302. Referring to the example of FIG. 3A, a user may upload data 310 via a window 312, as one example. Here, a user may use a cursor 316 to select and drag a file 314 within a border or a proximity of the window 312. As another option, the user interface 302 may include another mechanism for uploading a file such as a drop-down menu, a search bar, a radio button, or the like. The file 314 may include raw data associated with an asset such as time-series data, image data, audio data, and the like. The file may be a XML file, a spreadsheet, a word document, table data (rows, columns, etc.) and the like. There is not limited to the data that can be uploaded.

In addition to uploading data, the user may also input attributes such as metrics 320 for evaluating machine learning models that are to be built using the features identified in the extended feature space. For example, the user may select metrics via a drop down menu 322. The menu also provides buttons to allow the user to remove 324 metrics and add 326 new metrics to the upload. The metrics 320 may include business metrics such as precision, sensitivity, confusion matrix, accuracy, and the like. Metrics 320 are not limited to any particular metrics and may include any known metrics.

Figure 3B:
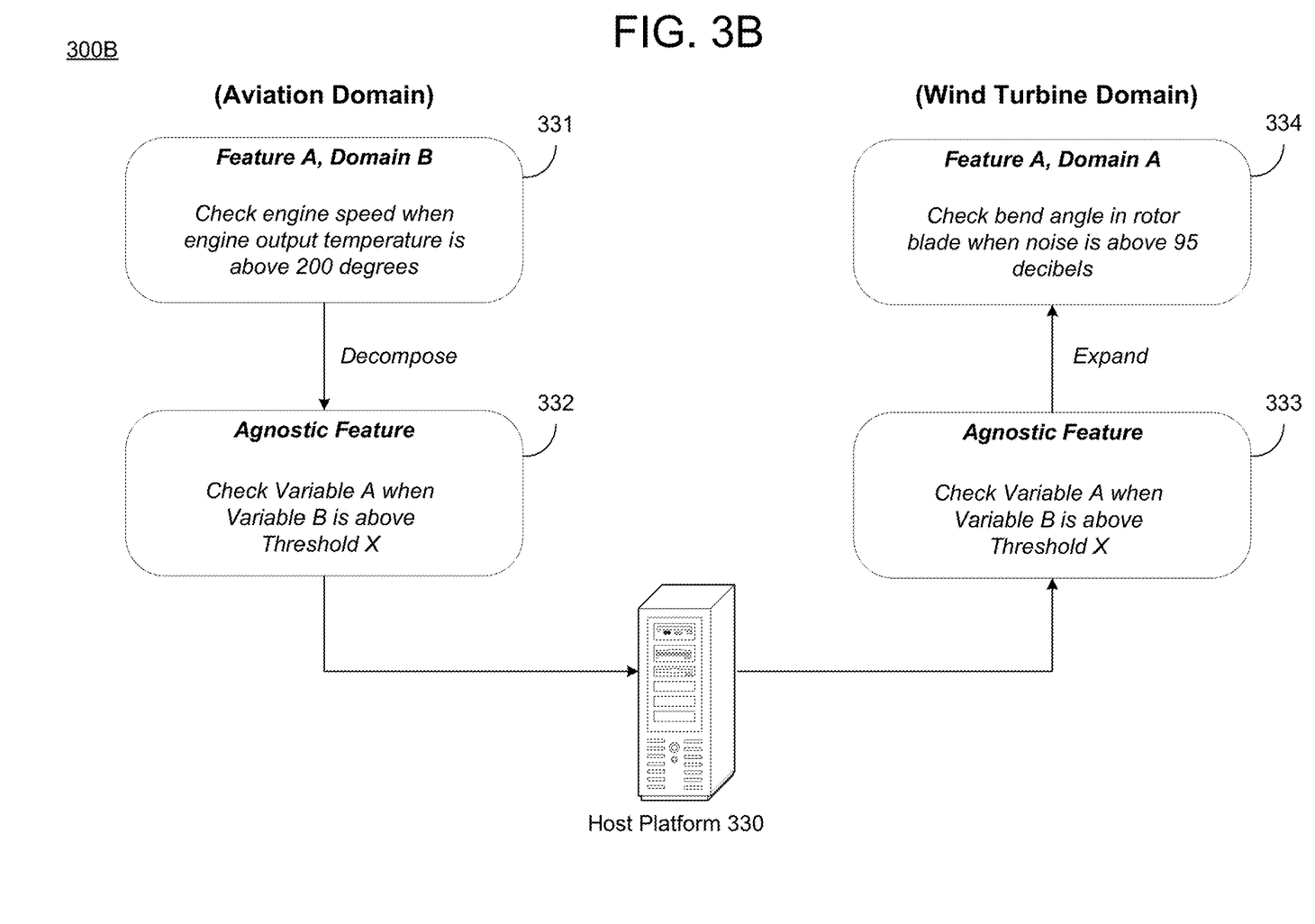

FIG. 3B illustrates a process 300B of the system described herein determining a feature for a first domain (wind turbine) based on a previously used features in a second domain (aviation). In this example, a host platform 330 performs the cross-domain determination of features from a cross-domain feature space that may be stored on the host platform 330 or stored remotely but accessible to the host platform 330. Here, the host platform 330 may be a server, a user device, a cloud platform, a database, and the like.

In this example, the host platform 330 receives input data from the target domain which in this example is the wind turbine domain. The input data may include raw data as well as metrics to be used to evaluate a machine learning model designed for predicting information from the raw data. In response, the host platform 330 may perform a search of the cross-domain feature space to identify any features in any domains that could be useful for the input data in the wind turbine domain. In 331, the host platform identifies a feature in the aviation domain which includes "check engine speed when engine output temperature is above 200 degrees." This feature may already be decomposed into an agnostic feature as shown in 332. In other words, the host platform may be performing a search on agnostic features after decomposition has been performed. In this example, the aviation feature has been converted into a generic feature of "check Variable A when Variable B is above Threshold X."

According to various aspects, the agnostic feature is identified in 333 as being a possible contributor for the wind turbine domain. The host platform 330 may use machine learning techniques to evaluate and identify which features from the cross-domain feature pool may be useful in the current domain based on the input data. Furthermore, in 334, the host platform 330 may expand the agnostic feature into a domain-specific feature associated with the problem to be solved in the wind turbine domain. In this example, the problem is related to preventing the rotor blade from being damages as a result of rotational force on the base of the wind turbine. Therefore, the agnostic feature is converted into "check bend angle in rotor blade when noise is above 95 decibels." This refers to a situation where a sound sensor listens to the noise being made by the rotor blade as it rotates about the axis of the wind turbine. When too much noise is being heard, the blade is possible being bent causing damage.

Although not shown in the example of FIG. 3A or 3B, the output of the system may be a list of auto-recommended features to be used by a developer based on the input data received via the user interface in the process 300A shown in FIG. 3A and determined through the process 300B shown in FIG. 3B. The output features may include details which have been added by the system based on the target domain. For example, as shown in FIG. 3B, the system may take the basic decomposed feature and expand the feature to include domain-specific information of the target domain. The result is a more optimal set of features from across multiple domains rather than a feature set from a specific domain.

Figure 4:
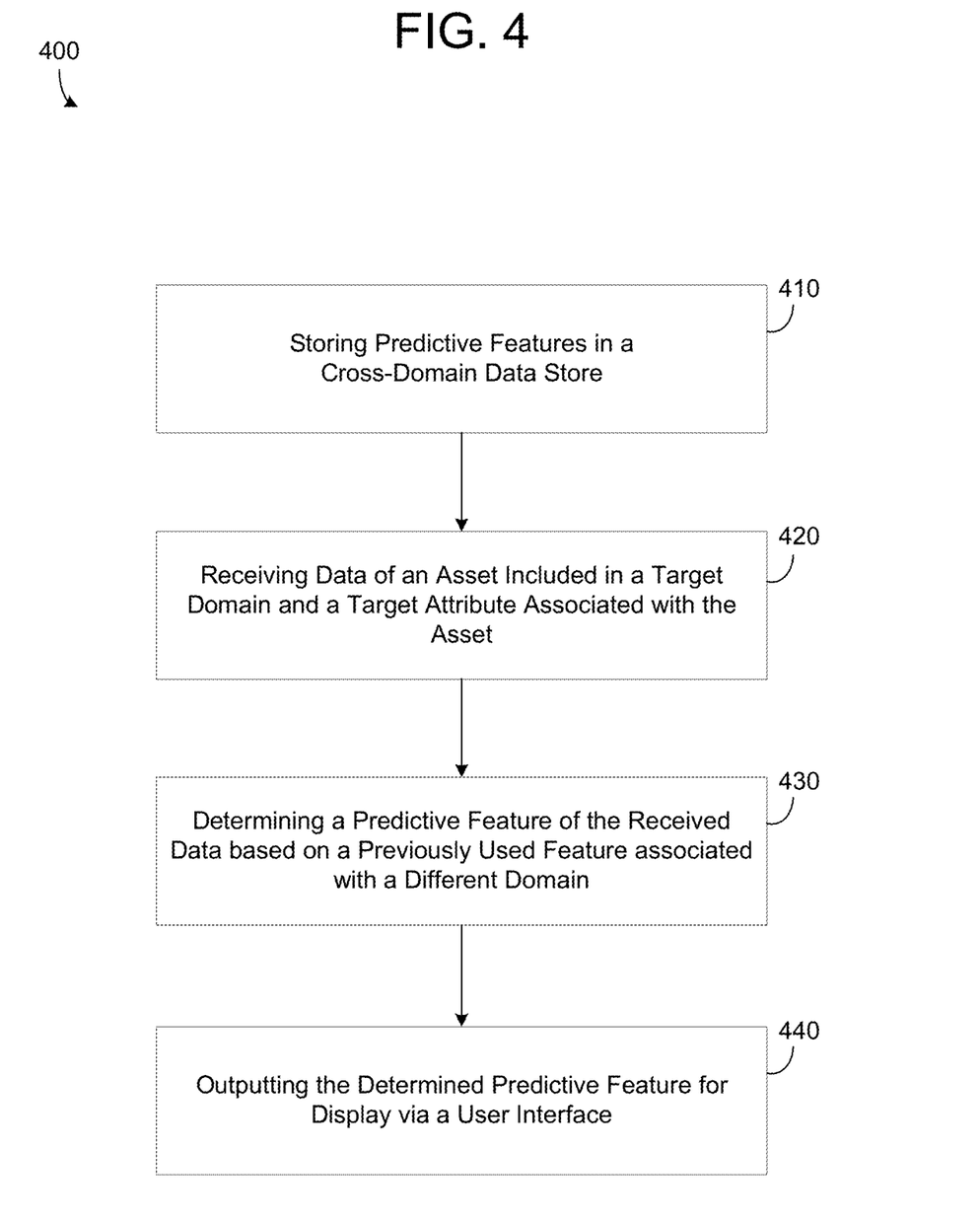
FIG. 4 is a diagram illustrating a method for generating predictive features based on cross-domain features in accordance with an example embodiment.

FIG. 4 illustrates a method 400 for generating a predictive feature based on cross-domain features in accordance with an example embodiment. For example, the method 400 may be performed by a computing system such as a server (e.g., a web server, etc.), a user device, a cloud platform, a database, and the like. In some embodiments, the method 400 may be performed by a single device or multiple devices working together. Referring to FIG. 4, in 410, the method may include storing predictive features in a cross-domain feature store. For example, the predictive features previously used in machine learning modeling may include features from among a plurality of different domains. Domains may include different verticals in industrial technical areas such as aviation, healthcare, chemical production, locomotives, oil and gas, and the like. In some embodiments, the storing may include decomposing the predictive features into quantitative components of the predictive features and then storing the quantitative components within the cross-domain data store. The decomposing may remove domain-specific aspects of the features into a more generalized or agnostic physics-based representation.

In 420, the method may include receiving data of an asset included in a target domain and information about an evaluation attribute associated with the asset in the target domain. For example, the data of the asset may include raw time-series data that has been acquired by a sensor (e.g., pressure, sound, speed, temperature, motion, imaging, etc.). As another example, the input data may include images, audio files, documents, files, spreadsheets, tabular data (rows, columns, etc.), weather data and the like. The target domain may include an industrial domain where the asset exists, and the previously used predictive feature (or features) may be associated with machine learning models used with an asset in a different industrial domain than the target domain. The evaluation attributes may include one or more machine learning metrics and/or business metrics for which the machine learning algorithm is to be measured against. These metrics may be used to evaluate a machine learning model that is ultimately designed based on the predictive features.

In 430, the method may include determining predictive features in the received data based on previously used predictive features stored in the cross-domain feature store which is associated with machine learning models in a different domain and the evaluation attributes, and in 440 the method may include outputting the determined predictive features for display via a user interface and feeding them to other machine learning model development modules. In some embodiments, the determined predictive features may include a quantitative data element derived from one or more data elements included in the received data. In some embodiments, the determining may include identifying the previously used predictive features based on a decomposed structure of the previously used predictive features. In some embodiments, the determining may include predicting an optimal subset of predictive features in the received data based on a plurality of previously used predictive features stored in the cross-domain feature store and the evaluation attributes.

Although not shown in FIG. 4, in some embodiments, the method 400 may further include building or otherwise composing machine learning models for the target domain using the determined predictive features which are determined based on the previously used predictive features in the different domains. For example, the predictive feature may be incorporated within machine learning algorithms chosen from a list of algorithm types via a user interface. The better the features, the less-strict the need for a "more complex" model. In some embodiments, the evaluation attributes may include one or more metrics against which machine learning models are evaluated.

Figure 5:
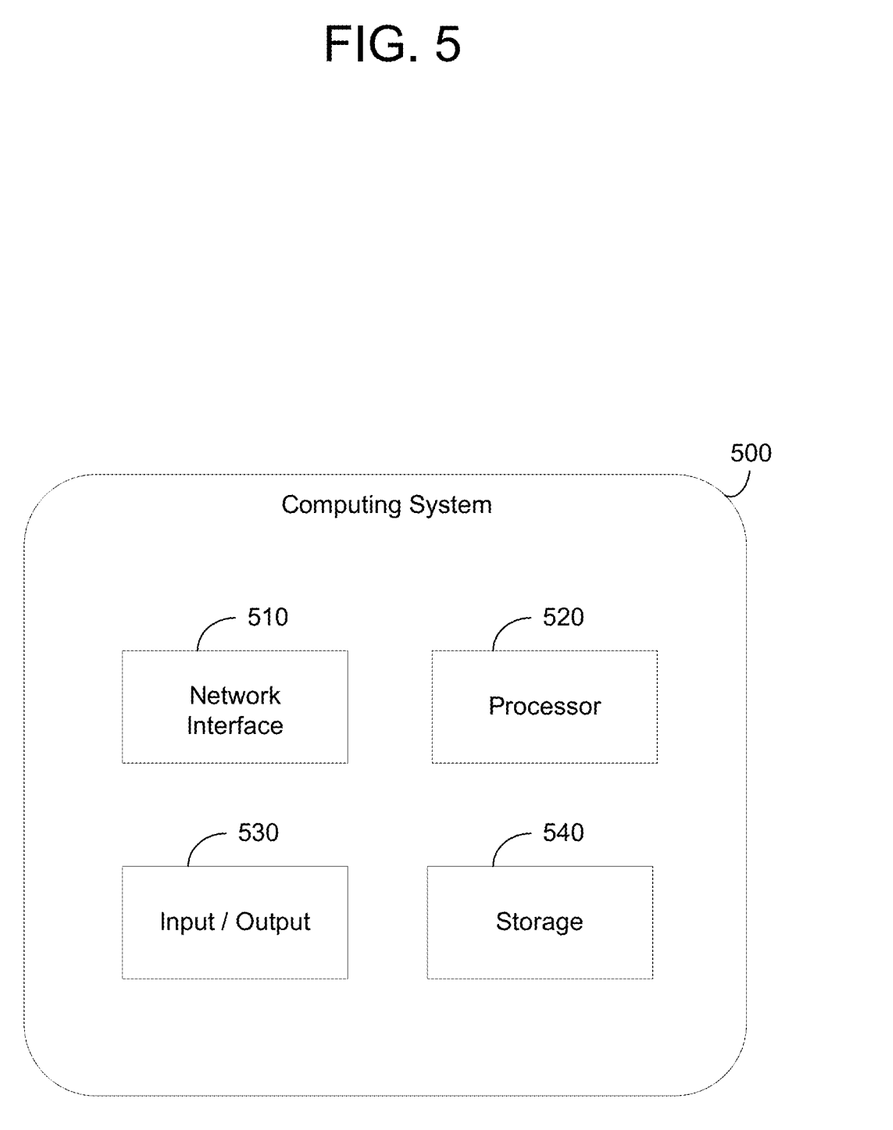
FIG. 5 is a diagram illustrating a computing system for use with any of the example embodiments.

FIG. 5 illustrates a computing system 500 for determining a service contract renewal propensity in accordance with an example embodiment. For example, the computing system 500 may be a cloud platform, a server, a user device, or some other computing device with a processor. Also, the computing system 500 may perform the method of FIG. 4. Referring to FIG. 5, the computing system 500 includes a network interface 510, a processor 520, an input/output 530, and a storage device 540. Although not shown in FIG. 5, the computing system 500 may include other components such as a display, a microphone, a receiver/transmitter, and the like. In some embodiments, the processor 520 may be used to control or otherwise replace the operation of any of the components of the computing system 500.

The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. The input/output 530 may be a hardware device that includes one or more of a port, an interface, a cable, etc., that can receive data input and output data to (e.g., to an embedded display of the device 500, an externally connected display, an adjacent computing device, a cloud platform, a printer, an input unit, and the like. The storage device 540 is not limited to any particular storage device and may include any known memory device such as RAM, ROM, hard disk, and the like.

In some embodiments, the storage 540 may be a cross-domain feature storage that is configured to store a pool of predictive features from across a plurality of different domains within a single common space. For example, the pool of predictive features may be stored in a common database, file, table, etc. The predictive features may be those previously used in machine learning modeling in any of the different domains. The common storage pool may be referred to as a cross-domain feature space which can be used for feature engineering for machine learning models.

In some embodiments, the processor 520 may receive data of an asset included in a target domain and information about an evaluation attribute associated with the asset in the target domain. In some embodiments, the target domain may include an industrial domain where the asset exists, and the previously used predictive features may be associated with machine learning models used with assets in different industrial domains than the target domain.

The processor 520 may determine predictive features in the received data based on previously used predictive features stored in the cross-domain feature store which is associated with machine learning models in different domains and the evaluation attributes. Furthermore, the processor 520 may output the determined predictive features for display via a user interface and feeding them to other machine learning model development modules. In some embodiments, the processor 520 is further configured to decompose the predictive features into quantitative components of the predictive features and store the quantitative components within the cross-domain storage. Here, the determined predictive features may include a quantitative data element (e.g., maximum, minimum, equation, etc.) derived from one or more data elements included in the received data.

In some embodiments, the processor 520 may identify the previously used predictive features based on a decomposed structure of the previously used predictive features. In some embodiments, the processor 520 may predict an optimal subset of predictive features in the received data based on a plurality of previously used predictive features stored in the cross-domain storage and the evaluation attributes. In some embodiments, the processor 520 may build machine learning models for the target domain using the determined predictive features which are determined based on the previously used predictive features in different domains. In some embodiments, the evaluation attributes may include one or more metrics against which the machine learning models are evaluated.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a cross-domain storage; and
a processor configured to
decompose domain-specific training features from one or more different domains into domain-agnostic trainings features by modifying text content within the domain-specific training features and store the decomposed domain-agnostic training features within the cross-domain storage;
receive, via a user interface, a request to build a machine learning model associated with an asset included in a target domain including data and an evaluation attribute associated with the asset in the target domain,
convert, via execution of a machine learning model, the domain-agnostic training features into a domain-agnostic feature space,
determine, via execution of a predictive model on the received data and the evaluation attribute of the target domain, a previously decomposed domain-agnostic feature from a different domain stored in the cross-domain data store which is recommended for building the machine learning model based on the domain-agnostic features in the domain-agnostic feature space,
train the machine learning model associated with the asset based on the data, the evaluation attribute, and the decomposed domain-agnostic feature from the different domain to create a trained machine learning model, and
storing the trained machine learning model in memory and output information about the training for display via the user interface.

2. The computing system of claim 1, wherein the processor is further configured to decompose the domain-specific training features into quantitative components of the domain-specific training features and store the quantitative components within the cross-domain storage.

3. The computing system of claim 1, wherein the previously decomposed domain-agnostic feature comprises a quantitative data element derived from one or more data elements included in the received data.

4. The computing system of claim 1, wherein the target domain comprises an industrial domain where the asset exists, and the previously decomposed domain-agnostic feature is associated with a machine learning model used with an asset in a different industrial domain than the target domain.

5. The computing system of claim 1, wherein the processor is configured to identify the previously decomposed domain-agnostic feature based on a decomposed structure of the previously decomposed domain-agnostic feature.

6. The computing system of claim 1, wherein the processor is configured to predict an optimal subset of predictive features in the received data based on a plurality of previously decomposed domain-agnostic features stored in the cross-domain storage and the evaluation attribute.

7. The computing system of claim 1, wherein the evaluation attribute comprises one or more metrics against which the machine learning model associated with the asset is evaluated.

8. A method comprising:
decomposing domain-specific training features from one or more different domains into domain-agnostic trainings features by modifying text content within the domain-specific training features and storing the decomposed domain-agnostic training features in a cross-domain data store;

receiving, via a user interface, a request to build a machine learning model associated with an asset included in a target domain including data and an evaluation attribute associated with the asset in the target domain;

converting, via execution of a machine learning model, the domain-agnostic training features into a domain-agnostic feature space;

determining, via execution of the predictive model on the data and the evaluation attribute, a previously decomposed domain-agnostic feature from a different domain stored in the cross-domain data store which is recommended for building the machine learning model based on the domain-agnostic features in the domain-agnostic features space;

training the machine learning model associated with the asset based on the data, the evaluation attribute, and the decomposed domain-agnostic feature from the different domain to create a trained machine learning model; and storing the trained machine learning model in memory and outputting information about the training for display via the user interface.

9. The method of claim 8, wherein the storing further comprises decomposing the domain-specific training features into quantitative components of the domain-specific training features and storing the quantitative components within the cross-domain data store.

10. The method of claim 8, wherein the previously decomposed domain-agnostic feature comprises a quantitative data element derived from one or more data elements included in the received data.

11. The method of claim 8, wherein the target domain comprises an industrial domain where the asset exists, and the previously decomposed domain-agnostic feature is associated with a machine learning model used with an asset in a different industrial domain than the target domain.

12. The method of claim 8, wherein the determining comprises identifying the previously decomposed domain-agnostic feature based on a decomposed structure of the previously used predictive feature.

13. The method of claim 8, wherein the determining comprises predicting an optimal subset of predictive features in the received data based on a plurality of previously decomposed domain-agnostic features stored in the cross-domain data store and the evaluation attribute.

14. The method of claim 8, wherein the evaluation attribute comprises one or more metrics against which the machine learning model associated with the asset is evaluated.

15. A non-transitory computer readable medium storing instructions which when executed cause a computer to perform a method comprising:

decomposing domain-specific training features from one or more different domains into domain-agnostic trainings features by modifying text content within the domain-specific training features and storing the decomposed domain-agnostic training features in a cross-domain data store;

receiving, via a user interface, a request to build a machine learning model associated with an asset included in a target domain including data and an evaluation attribute associated with the asset in the target domain;

converting, via execution of a machine learning model, the domain-agnostic training features into a domain-agnostic feature space;

determining, via execution of a predictive model on the data and the evaluation attribute of the target domain, a previously decomposed domain-agnostic feature from a different domain stored in the cross-domain data store which is recommended for building the machine learning model based on the domain-agnostic features in the domain-agnostic features space;

training the machine learning model associated with the asset based on the data, the evaluation attribute, and the decomposed domain-agnostic feature from the different domain to create a trained machine learning model; and storing the trained machine learning model in memory and outputting information about the training for display via the user interface.

16. The non-transitory computer readable medium of claim 15, wherein the storing further comprises decomposing the domain-specific training features into quantitative components of the domain-specific training features and storing the quantitative components within the cross-domain data store.

17. The non-transitory computer readable medium of claim 15, wherein the previously decomposed domain-agnostic feature comprises a quantitative data element derived from one or more data elements included in the received data.

18. The non-transitory computer readable medium of claim 15, wherein the target domain comprises an industrial domain where the asset exists, and the previously decomposed domain-agnostic feature is associated with a machine learning model used with an asset in a different industrial domain than the target domain.

* * * * *